United States Patent [19]

Kunz

[11] Patent Number: 5,108,616

[45] Date of Patent: Apr. 28, 1992

[54] PROCESS FOR ION EXCHANGERS, PARTICULARLY FOR REGENERATION AFTER SOFTENING AND DEMINERALIZATION OF AQUEOUS SOLUTIONS

[76] Inventor: Gerhard K. Kunz, Ruhrstr. 111, 5628 Heiligenhaus, Fed. Rep. of Germany

[21] Appl. No.: 369,238

[22] Filed: Jun. 22, 1989

[30] Foreign Application Priority Data

Jun. 22, 1988 [DE] Fed. Rep. of Germany ....... 3821036

[51] Int. Cl.⁵ .............................................. C02F 1/42
[52] U.S. Cl. ...................................... 210/678; 521/26
[58] Field of Search ................ 210/269, 275–279, 210/670, 678, 687; 521/26

[56] References Cited

U.S. PATENT DOCUMENTS

| | | | |
|---|---|---|---|
| 4,181,605 | 1/1980 | Braswell | 210/678 |
| 4,184,893 | 1/1980 | Halvorson et al. | 521/26 |
| 4,202,737 | 5/1980 | Shimizu | 521/26 |
| 4,379,057 | 4/1983 | Maiser et al. | 210/662 |
| 4,385,992 | 5/1983 | Clauer et al. | 210/662 |

FOREIGN PATENT DOCUMENTS

| | | |
|---|---|---|
| 3528800 | 2/1987 | Fed. Rep. of Germany . |
| 1352176 | 1/1964 | France . |
| 61-12490 | 4/1986 | Japan . |

*Primary Examiner*—Ivars Cintins
*Attorney, Agent, or Firm*—Fleit, Jacobson, Cohn, Price, Holman & Stern

[57] ABSTRACT

The invention concerns an ion exchange process and system, particularly for the regeneration step following a softening or desalination of aqueous solutions. The regenerant solution is fed in an upward stream through the ion exchanger in a direction opposite to the charging direction, as a sequence of intermittent pulse intervals consisting of pulse flow followed by a period of no flow. During the pulse flow, there is limited hydrodynamic lifting of the ion exchange resin beds in layers, followed by subsequent sedimentation during the pause period, without mixing of the layers.

12 Claims, 2 Drawing Sheets

PROCESS FOR ION EXCHANGERS, PARTICULARLY FOR REGENERATION AFTER SOFTENING AND DEMINERALIZATION OF AQUEOUS SOLUTIONS

FIELD OF INVENTION

This invention relates to a process for treating ion exchangers, and to the apparatus thereof, particularly for regenerating ion exchangers following the softening and/or demineralization of aqueous solutions, wherein a regenerating solution is passed through the ion exchanger for recharging, and the exchanger can then be returned to service after rinsing in the regenerated, washed state for further softening or demineralization

BACKGROUND ART

It is generally known that, during charging processes such as softening or demineralization of aqueous solutions, the ion exchanger materials, such as bead-like ion exchange resins, accept ionogenic dissociation components of the dissolved salts, such as calcium ions, and release the ions stored in the active centers of the ion exchange material, such as sodium ions, into the aqueous solution. When the supply of stored ions is depleted—i.e., in this example, when all stored sodium ions are exchanged for calcium ions—the ion exchange stops. In order to regenerate the ion exchange material, a solution of the ions stored, e.g , a sodium chloride solution, is passed through the ion exchange materials bed, and the ions accepted by the exchanger during charging, i.e , the calcium ions, are eluted, and the sodium ions supplied from the regenerating agent are placed back onto the active sites of the ion exchange material.

To conduct regeneration following charging in the downward direction, it is known to feed the regenerating solution from top to bottom, i.e., in a co-current direction, through the ion exchanger. The regeneration of the ion exchange bed in a co-current direction has considerable drawbacks, as illustrated by the example of the softening of hard water. In this case, hard water flows through layers of ion exchanger material (such as ion exchange resins) in a filter container, and the exchanger becomes charged in the flow direction, i.e., from top to bottom, with calcium ions. The lower the concentration of calcium ions in the lowermost ion exchange layer, which is the last one through which the water to be treated flows, the lower the residual hardness in the product water, i.e., the better the quality. During the subsequent regeneration in a co-current system, the calcium ions highly enriched in the upper ion exchanger layers are eluted from the resin by the regenerating solution and washed into the lower layers. In order to confer to these lower layers a good state of regeneration, the entire ion exchanger must be treated with a large excess of regenerating agent. These excess amounts are not fully utilized and represent a major economic loss. Furthermore, these excesses get into the sewage and increase the salt levels in the sewers. The excess sodium and chloride ions of the unused regenerate are environmentally detrimental.

It is also known to run the regenerant solution in the direction opposite to the charging direction, i.e., in an upward or countercurrent direction, through the ion exchanger. the disadvantage of this process is that the entire bed of ion exchange material is turned over and mixed together In particular, the ion exchange resins highly charged with calcium ions are forced from the upper layers to the lower layers, and the ion exchange material that is still largely uncharged is forced upward from the lower layers. Thus, because of this rearrangement, the entire ion exchange bed must be treated with a large excess of regenerant in order to achieve good product quality. The unused regenerant portion enters the sewers as highly salinated waste water and is also a major burden to the environment. If regeneration is conducted, for example, with 200% of the theoretical amount, twice as much regenerant—sodium chloride in the case of water softening—enters the sewage during each cycle than would be theoretically necessary.

It has now been found that the most efficient use of regenerant and, at the same time, the best product quality is obtained when the ion exchange materials are not mixed or rearranged during the regenerative treatment cycle with upward flow. In known systems, attempts have been made to control the mixing either by physical restraints or by blocking flow from the top. Each of these attempt has its own known drawbacks and operational problems.

Accordingly, it is the object of the present invention to overcome the aforesaid problems associated with regenerating layered beds ion exchange materials, such as ion exchange resins.

Specifically, it is the object of the present invention to achieve the regeneration with substantially less regenerating agent thereby obtaining a substantial saving in regenerant costs. It is a further object of the present invention to regenerate the ion exchange materials with substantially less regenerating agent discharging to waste, thus substantially reducing the detriment to the environment.

SUMMARY OF THE INVENTION

In accordance with the present invention, layered ion exchange material in a filter container charged by downward flow, is first treated with regenerant and then with rinse solution, feeding these solutions into the ion exchanger materials in a direction opposite or countercurrent to the charging direction. This feed of both the regenerant and then the rinse solution is conducted in an upward flow such that the exchange granules or beads are loosened but no mixing or rearrangement of the layers occurs in the flow direction, and the regenerant and rinse solutions are then discharged above the ion exchange bed.

The exchange granules are loosened but not mixed or rearranged in accordance with the present invention by a process in which the stream of liquid, used as the regenerant solution and the rinse solution, are each fed discontinuously in a direction opposite the charging direction so that this liquid stream comprises a series of pulse intervals each consisting of a short pulse flow and then followed by a subsequent pause time during which there is substantially no flow of liquid. During the pulse flow there is hydrodynamic lifting of the ion exchange granules or beads and during the pause or rest time the granules are permitted to resettle to their original position. Preferably, the pulse flow is designed to permit a lifting height of no more than ten times the greatest grain diameter of the ion exchange resin; however, greater lifting may be permitted depending the characteristics of ion exchanger. The pause or rest time following each pulse flow lasts until substantially complete sedimentation of the ion exchange resins lifted during the pulse flow, particularly in the region of the liquid feed. Only after substantially complete sedimentation is the ion exchanger again subjected to the pulse flow of the next pulse interval.

Typically, the pulse time is quite short and should not exceed three-four seconds. For a pulse volume that moves the ion exchange bed no more than approximately ten bead diameters, with a regenerant solution that is of lower density than the beads to be regenerated, the pulse time should preferably not exceed two seconds. In such a system, the pause time or bed resting time should not exceed about forty seconds. However, longer rest times can be utilized in accordance with this invention since longer times do not detract from the technical effect of invention, but do extend the overall time for the regeneration and rinsing cycles. Unnecessary time for carrying out these cycles, may adversely affect the overall economics of the invention.

The sequence of pulse intervals is continued until the end of the regenerative treatment cycle and is then repeated for the rinsing cycle. Each liquid stream thus intermittently flows upward through the entire ion exchanger and is finally discharged as waste water after it passes through the last, uppermost layer.

By practice of the present invention including (a) feeding the regenerant solution into a downwardly charged ion exchanger in a direction opposite to the charging direction and into the ion exchanger layer through which the charging stream flows last, (b) conducting this feed discontinuously in the form of pulse intervals consisting of alternate pulse flow and the non-flow pauses, and (c) designing the pulse intervals so that the pulse flow raises an entire ion exchange layer but does not exceed a maximum lifting height and the pause time causes substantially complete sedimentation of the ion exchange resins after each pulse flow, only then resuming the pulse flow, the problems described previously are not only solved, but technical and economical advantages are also provided. Certain of these advantages can be summarized as follows.

First, the ion exchange materials which have a great tendency to mix during upstream flow, remain in stable layers due to the limitation of the pulse stream and hence the lifting height in accordance with the invention. In other words, the ion exchange materials or resins remain substantially in place during the treatment in the upward stream without mixing the layers. As a result, the concentration profile produced in the ion exchanger during the prior charging remains intact, for efficient utilization of the maximum concentration differences needed for optimum ion exchange. The maximum efficiency of regenerant use, i.e., the lowest possible excess of regenerant, is achieved while simultaneously affording the best product quality and sufficient capacity. The concentration profile produced in the ion exchanger during charging in a downward flow—i.e., the concentration gradient of the absorbed ions in the ion exchanger in the direction of the charging flow—is not disturbed by rearrangement during regeneration of the ion exchange materials by the upward flow, and the concentration profile newly produced during regeneration remains intact until the end of rinsing.

Second, the discontinuous feed of the regenerant and rinse solution in an upward flow, and the division of these liquid streams into pulse intervals consisting of a pulse flow and a pause time produce a loosening zone throughout the entire cross section of the granular or beaded ion exchange bed. A uniform liquid distribution is thus caused throughout the loosening zone, which results in practically complete ion exchange up to the concentration equilibria of the ion system.

Third, another advantage of the present invention is that, due to the pause time determined by substantially complete sedimentation of the exchange materials after each pulse flow, and due to the fact the next pulse flow against the sedimented ion exchange material does not occur until thereafter, a stable plug flow is achieved for the sequence of the intermittent pulse flows throughout the entire regenerative and rinsing treatments of the ion exchanger. Unwanted mixing of the ion exchanger is thus prevented, and efficient use of regenerant is achieved.

Fourth, the pulsed lifting of the ion exchange beads up to a limited height, preferably no more than ten times the greatest grain diameter, in accordance with the present invention, produces an advantageous loosening of the ion exchange bed without causing any remixing that would considerably deteriorate the efficiency of regeneration. A significant advantage of this loosening, which proceeds wavelike in the form of loosening zones throughout the ion exchange bed, is that channelling and aggregation in the ion exchange bed are eliminated. Hence, non-homogeneous distribution of liquid and reduced efficiency are avoided. Advantageously, this loosening also causes finely-dispersed particles in the ion exchange material in the form of either exchanger particles themselves or dirt or other suspended solids in the fed liquid are dislodged and discharged, thus preventing deposition of these particles in the ion exchanger and consequent aggregation of the beads.

Fifth, a major advantage of the present invention is that, due to the feeding of regenerant and rinse solution in the direction opposite the flow direction of the charge, and due to the division of this flow into pulse flows and non-flow pauses with limitation of the lifting height for the ion exchange materials, the otherwise extensive remixing of the ion exchange resins is avoided. Because of this hydrodynamic stabilization of the ion exchange bed, a countercurrent system can be utilized for the charging and regenerating cycles of the ion exchange. This means that the concentrations in both the charging phase and regenerating phase follow the equilibrium curves applicable to the ion system of the exchanger, not only during charging but also during regeneration, thus optimizing the process.

Sixth, the present invention enables the layering of the ion exchanger materials to remain intact. As a result, the lowermost ion exchange materials in the filter container, which determine the quality of the product during charging, are treated first as fresh regenerant solution enters the filter container, and are thus optimally regenerated. At the other end, the regenerant solution ultimately passes through the uppermost, most highly charged ion exchange materials, and is therefore completely utilized. This means that not only is the best product quality possible, but also the regenerant excess entering the sewers, consisting mostly of salts hazardous to vegetation and the environment are drastically reduced.

This reduction of the amount of regenerant used is also a definite economic advantage due to the substantial cost saving in the quantity of chemicals required for regeneration and the sewer costs associated with discharging excess salt in the effluent.

Seventh, another advantage of the present invention is that, due to the formation of loosening zones in the ion exchange bed, the liquid flow is not mixed; this results in substantially reducing the rinse water requirement for rinsing the regenerant, providing not only an economical advantage but also discharging less waste water to the sewers.

Eighth, due to the advantages of the present invention, in the case of large filters, mechanical installations for supporting the upper layers of the exchanger, such as nozzle systems, drainage systems and the like previously used for regenerative countercurrent treatment of ion exchangers are obviated. Such systems can therefore be produced at lower initial equipment cost. In small filters, though, in which, for geometric reasons, no mechanical installations could be housed heretofore, ion exchange processes such as softening or demineralization of water can be conducted in a countercurrent manner under optimum conditions and with results close to the theoretical limits of the ion exchange system.

BRIEF DESCRIPTION OF THE DRAWINGS

Other objects and advantages of the instant invention will be apparent from the following detailed description of certain preferred embodiments which are described below with reference to the accompanying drawings, wherein like numbers correspond to the numbers herein.

DETAILED DESCRIPTION OF THE INVENTION

Figure 1:
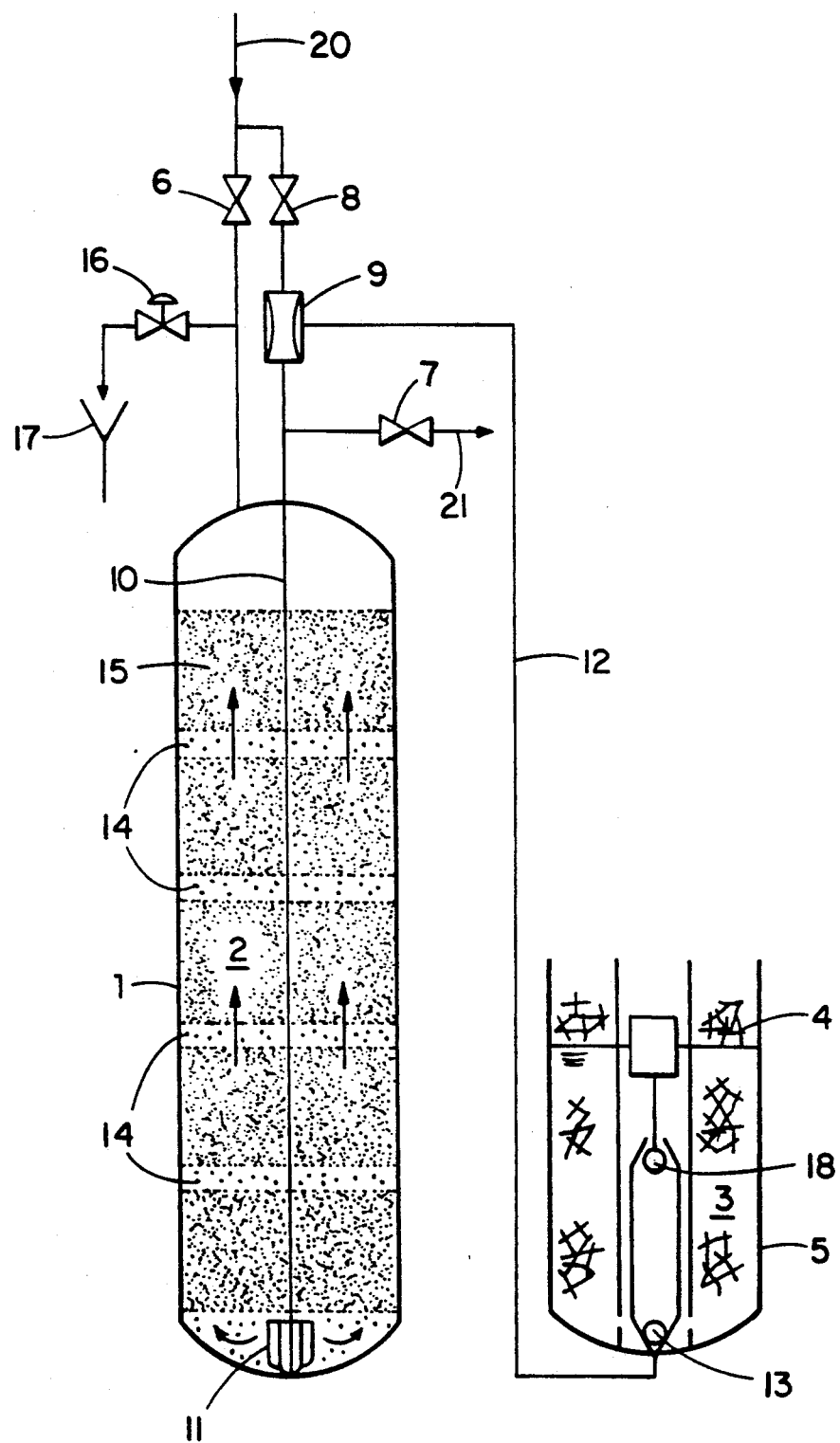
FIG. 1 illustrates an example of a configuration of the present invention for softening water and for regenerative treatment of the ion exchange material with sodium chloride solution, such as in a commercial or residential water softening installation.

According to FIG. 1, there is shown a schematic configuration consisting of a filter container 1 with ion exchange materials 2 therein, feed line 20 and discharge line 21 for the downwardly flowing aqueous stream with their respective valves 6 and 7, and a storage container 5 for the regenerant solution 3. The regenerative treatment of the ion exchange materials 2 arranged in layers in the filter container 1 is performed with sodium chloride solution 3, which is kept together with a supply of solid sodium chloride 4 in the storage container 5. With the hard water valve 6 and the product valve 7 closed, drive water is fed through the open hard water valve 8 through injector 9 and through line 10 into filter nozzle 11 at the bottom of container 1. As a result, concentrated sodium chloride 3 is sucked by injector 9 through line 12 and foot valve 13 and mixed with the drive water. The sodium chloride solution diluted in pipeline 10 with the drive water is the regenerant solution. The regenerant solution flows out of the filter nozzle 11 in pulse intervals in the form of a short pulsed flow, which hydrodynamically lifts the ion exchange resins a short distance in a continuous wave configuration up the ion exchanger. The short pulsed flow is followed by a pause time during which the ion exchange materials return substantially to their original layer position. These pulse intervals produce the loosening zones 14, which also travel in waves throughout the ion exchanger bed, ultimately passing through the uppermost ion exchange layer 15, which is most highly loaded with calcium ions.

During its passage through ion exchanger 2, the regenerant solution will release most of its sodium ions to the ion exchange resins, exchanging with the latter's calcium ions. The enrichment of calcium ions in the regenerant solution corresponds to the concentration equilibrium of the highly charged ion exchange resin in the last layer 15. This solution is discharged as waste water through valve 16 into the sewer 17.

In the configuration shown, valve 16 is utilized to produce the pulse intervals, including the intermittent pulsed flow and non-flow pauses, using known control techniques. Typical examples of control valves include electrically activated solenoid valves, pneumatically operated diaphragm valves, and hydraulically activated diaphragm valves which are controlled by one or more mechanical or electronically controlled timing devices. In accordance with the invention, the valves must be capable of being opened and closed at a fairly rapid rate in view of the relatively short pulse time for each pulse interval. However, these type control valves and mechanisms are well known in the ion exchange art, and they serve to control and operate the whole ion exchange process of charging, regeneration, and rinsing, automatically.

The time cycle of the alternating pulses and pauses is a function of several variables. The purpose is to regenerate all of the ion exchange resins but not disturb the resin bed sufficiently to cause it to mix or turn over during the regeneration. Therefore, the pulse time is a function of the configuration of the ion exchange bed, the volume of regenerant injected into the bed during the pulse time, the density of the regenerant solution, the diameter of the ion exchange beads and the density of the ion exchange beads. The pulse time is the time sufficient to hydrodynamically separate a layer of the bed into a loosening zone across the entire cross-section of the bed, but short enough to avoid mixing of the bed. The pause time or bed resting time is the time necessary for the bed to substantially settle completely.

When the supply of concentrated sodium chloride solution 3 in storage container 5 is nearly depleted, foot valve 13 closes, and only drive water flows through injector 9, which then flushes all regenerant from the ion exchanger 2 and also is discharged into the sewer 17 in intermittent pulse flows followed by pauses. After flushing, valves 8 and 16 close, and hard water valve 6 and product valve 7 open. Hard water flows through valve 6 to the uppermost layer 15 of ion exchanger 2 and flows through the latter in a downward stream. The water passes last through the lowermost layer of the ion exchanger and passes through filter nozzle 11 into pipeline 10, leaving the filter as product water through line 21. A partial stream of this product water flows through injector 9 and pipeline 12 into storage container 5 and fills the container until float valve 18 closes. Due to dissolution of the solid sodium chloride 4, a concentrated sodium chloride solution 3 again forms as a supply for the next regenerative treatment of ion exchanger 2.

While hard water is flowing through ion exchanger 2, the latter accepts calcium ions and in exchange releases sodium ions to the water as it flows through. The residual concentration of calcium ions in the product water is determined by the last ion exchange layer through which the water flows, i.e., by the lowermost layer. The residual concentration is that equilibrium concentration corresponding to the degree of charging or regeneration of this lowermost layer. The lower the calcium ion concentration in this lowermost ion exchange layer, the lower the residual concentration in the product water and hence the better the quality of the product. This is the case in the example illustrated in the drawing, in which no remixing of the ion exchange material 2 occurs, and thus no portion of the uppermost layer 15, charged to a high degree with calcium ions, can enter the lowermost layer in the region of filter nozzle 11.

The table below illustrates the efficiency of the present invention illustrated in FIG. 1, based on the example of two water softening filters, filter A being operated in accordance with the invention and filter B according to the prior art. The table contains information on the filter size and the measurements obtained after 200 successive charging and regeneration cycles of the ion exchanger.

| Filter dimension Operating conditions Measurements | Filter | |
| --- | --- | --- |
|  | A | B |
| Filter diameter (mm) | 150 | 150 |
| Ion exchange resin (liters) | 14 | 14 |
| Hard water pressure (kg/sq. cm.) | 3.0 | 3.0 |
| Hard water hardness (degrees hardness German) | 19.4 | 19.4 |
| Charging rate (liters/hr) | 300 | 300 |
| Hard water total salt content (millivals/liter) | 8.3 | 8.3 |
| Residual hardness in the product (degrees hardness German) | 0.05 | 0.5–1.0 |
| NaCl amount per regeneration (grams) | 700 | 1000 |
| Regenerant consumption in % of theoretical amount | 115 | 180 |
| Soft water quantity produced (liters) | 1500 | 1370 |
| Discharge water in % of soft water quantity | 3 | 9 |

Figure 2:
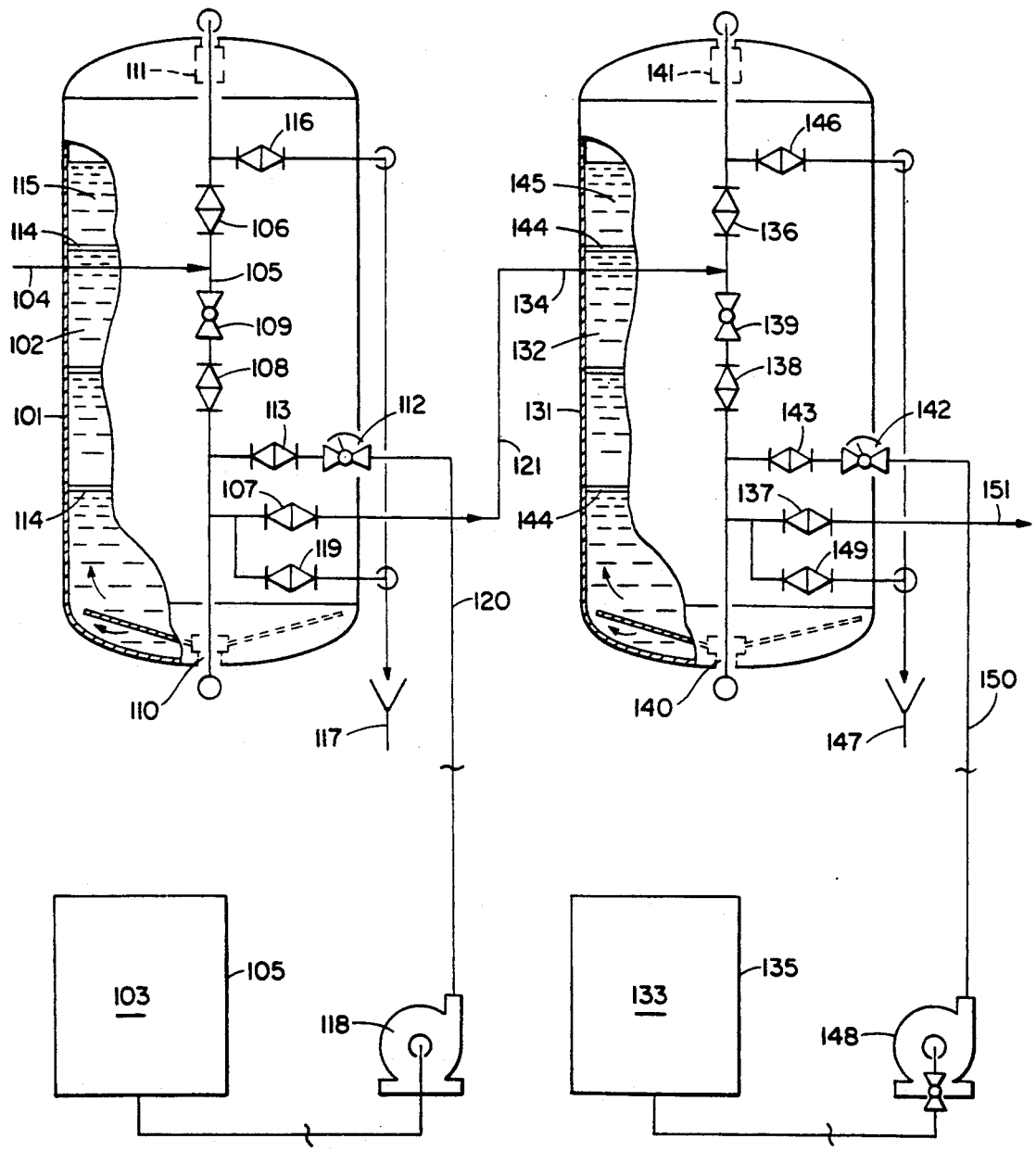
FIG. 2 illustrates another example of a configuration of the present invention for industrial applications in the softening or demineralization of aqueous solutions.

Turning now to FIG. 2, there is shown a schematic configuration such as is used in a commercial or industrial demineralization installation. Such installation consists of two filter vessels connected in series. Vessel 101 contains cation exchange resin 102, and vessel 131 contains anion exchange resin 132, resulting in product water that is substantially demineralized. As is customary in industrial installations, most of the piping, valves and equipment shown in FIG. 2 is normally installed outside of the vessels 101 and 131. Such outside placement facilitates maintenance and repair of these mechanical components as necessary, without having to open up or go into the exchange vessels themselves.

The cation exchanger 101 operates in the following manner. The cation exchange resin 102 becomes charged with cations from the raw feed water, such as sodium, calcium, magnesium and other metallic ions. These ions are charged onto the cation exchange resin from top to bottom with the increased concentration at the top, while the lowest concentration of cations is at the lowermost layer of ion exchange resin.

During regeneration, valves 106, 107, and 119 are closed. Regenerative chemicals 103, such as hydrochloric acid or sulfuric acid, in storage container 105 are pumped by pump 118 through pipe 120, which is regulated by valve 112 and controlled by valve 113. Drive water is fed from pipe 104 into main pipe 105 and is regulated by valve 109 and controlled by valve 108. It is then mixed with the acid coming over through valve 113, and enters into filter nozzle 110 in the bottom of tank 101. The diluted acid solution entering into the cation exchange resin bed 102 is the regenerant solution. The regenerant solution flows out of filter nozzle 110 in pulse intervals in the form of a pulsed flow which hydrodynamically lifts the cation exchange resins a short distance in a continuous wave configuration up the cation exchanger. The short pulsed flow is followed by a pause time during which the ion exchange materials return substantially to their original position. This pulse interval produces loosening zones 114, which also travel in waves up through the cation exchanger bed 102, ultimately passing through the uppermost layer 115, which is highly loaded with metallic ions and other cations.

While passing through cation exchange resins 102, the regenerant solution releases most of its hydronium ions to the cation exchange resins, exchanging it with the latter's cations. The enrichment of cations in the regenerant solution corresponds to the concentration equilibrium of the highly charged cation exchange resin in the uppermost layer 115. The solution is discharged through filter nozzle 111 in the upper end of vessel 101, through the upper portion of main pipe 105, and then as acidic waste water through valve 116 into the waste treatment system 117.

In the configuration shown, valve 116 is utilized to produce the pulse intervals including the intermittent pulsed flow with the non-flow, using known control techniques as previously described.

When the appropriate amount of acid 103 from container 105 is consumed, valve 113 closes and pump 118 shuts down, and only drive water flows through filter nozzle 110. The raw water then flushes out all remaining regenerants from the cation exchange resin 102 and is also discharged into the waste treatment system 117 in intermittent pulse flows followed by pauses. After flushing, valves 108 and 116 close, and raw water valve 106 and fast flush valve 119 open to waste treatment system 117. This allows raw water to flow through filter nozzle 111 to the uppermost layer 115 of ion exchange resin 102 and flow through the latter in a downward stream. The water passes through the lowermost layer of the ion exchange resin and passes through filter nozzle 110, past open fast flush valve 119 to waste 117. This arrangement resets the ion exchange bed and flushes out any residual regenerant solution. Thereafter, valve 119 closes and valve 107 opens to allow the treated raw water to pass out of exchange 101 through outlet pipe 121.

The decationized water (water that has substantially all of the cations removed from it) from pipe 121 is the feed/drive water for the anion exchanger 131 so that sequential regeneration can take place, as shown in FIG. 2. However, a separate source of feed/drive water for the anion exchanger can be utilized, if desired. It is commonly known that anion exchange resins must be regenerated and fed with decationized water, or with softened water in which all of the hardness ions have been removed, in order to prevent hardness scaling in the highly alkaline anion exchange resin.

The anion exchanger 131 operates in a manner substantially identical to the cation exchanger 101. The anion exchange resins 132 becomes charged with anions from decationized feed water, such as chloride, carbonates, sulfates and other organic anions. These anions are charged onto the anion exchange resin from top to bottom with the increased concentration at the top, while the lowest concentration of anions is at the lowermost layer of ion exchange resin.

During sequential regeneration of the anion exchanger valves 136, 137, and 149 are closed. Regenerative chemical 133, such as sodium hydroxide, in storage container 135 is pumped through pipe 150 which is regulated by valve 142 and controlled by valve 143. With the cation exchanger in operation to treat raw water and valves 106 and 107 open, drive water is feed to main pipe 134 from pipe 121. The drive water is regulated at the anion exchanger by valve 139, and is controlled by valve 138. The decationized water is mixed with the caustic coming over through valve 143, and enters into filter nozzle 140 in the bottom of vessel 131. The diluted caustic solution entering into the anion exchange resin bed 132 is the regenerant solution. The regenerant solution flows out of filter nozzle 140 in pulse intervals, controlled by valve 146, in the form of a pulsed flow which hydrodynamically lifts the anion exchange resins a short distance in a continuous wave configuration up the anion exchanger. The short pulsed flow is followed by a pause time during which the ion exchange materials return substantially to their original position. This pulse interval produces loosening zones 144, which also travel in waves up through the anion exchanger bed 132, ultimately passing through the uppermost layer 145, which is highly loaded with anions and organic acids.

While passing through anion exchange resins 132, the regenerant solution releases most of its hydroxyl ions to the anion exchange resins, exchanging then with the latter's anions. The enrichment of anions in the regenerant solution corresponds to the concentration equilibrium of the highly charged anion exchange resin in the uppermost layer 145. The solution is discharged as caustic waste water through valve 146 into the waste treatment system 147.

When the appropriate amount of caustic 133 from container 135 is consumed, valve 143 closes and pump 148 shuts down, and only drive water flows through filter nozzle 140. The decationized water then flushes out all remaining regenerants from the anion exchange resin 132 and is also discharged into the waste treatment system 147 in intermittent pulse flows followed by pauses. After flushing, valves 138 and 146 close, and drive water valve 136 and fast flush valve 149 open to waste treatment system 147 in resetting the ion exchange bed and flushing out any residual regenerant solution. Valve 149 closes and valve 137 opens allowing decationized water to flow through the ion exchange resins 132 in a downward stream, passing through filter nozzle 141 into pipeline 151 as deionized water.

It has been found in accordance with the present invention that the resultant product water from pipeline 151 achieves a much higher degree of demineralization than possible with known co-current demineralizers, and the chemicals consumed are reduced by at least 50%.

Those skilled in the art will readily recognize that many variations in the foregoing embodiments are possible without departing from the spirit and scope of the invention. For example, the size and shape of the filter container and ion exchanger bed are immaterial to the invention, as is the type and size of the ion exchange materials. As another example, it is possible to control the pulse interval, including the pulse flow and non-flow pause, by controlling the regenerant or rinse solution as it enters the ion exchanger rather than as it exits. For front end control, it may be necessary to deaerate the solution after the valve but before the solution enters the exchanger, to make certain that there are no entrapped air bubbles entering exchanger.

As a further example, the non-flow pause of the pulse interval could be a period of low flow rather than no flow. So long as the pulse flow of the pulse interval causes the ion exchange material of the bed to lift and the beads dispersed in a layered configuration, and the low flow of the pulse interval allows the dispersed beads of each layer to resettle to substantially their original position, without causing significant mixing between layers of the bed, the benefits of the present invention can be achieved. In this case, the liquid is likely to flow through the ion exchange bed in pulsed waves.

As a final example, any number of plumbing arrangements are possible without departing from the invention. It is not intended that the present invention be limited to only the disclosed embodiments. Other modifications will undoubtedly be recognized by those skilled in the art. Rather, the invention should be circumscribed by the scope of the appended claims.

I claim:

1. A method for treating an aqueous solution in an ion exchanger containing a non-constrained bed of ion exchange material in the form of ion exchange granules, which comprises:

passing the aqueous solution downwardly in a charging direction through the ion exchange material whereby a concentration profile is established in layers of said ion exchange material; and passing a regenerating solution upwardly through the non-constrained bed of ion exchange material in an intermittent pulsed flow comprising an alternating pulse flow of regenerating solution and a subsequent non-flow pause time, the duration and velocity of said pulse flow of regenerating solution being sufficient to hydrodynamically lift said ion exchange granules a controlled distance through substantially all of the ion exchange granules without causing significant mixing of said ion exchange granules between different layers of said ion exchange material, and the duration of said subsequent non-flow pause time being sufficient to permit said ion exchange granules to resettle in the ion exchanger to substantially complete sedimentation.

2. The method of claim 1 wherein said ion exchange granules are ion exchange resin beads and the hydrodynamic lifting of said ion exchange resin beads is no more than ten times the largest diameter of said beads.

3. The method of claim 1 wherein the duration of said pulse flow of regenerating solution is no more than four seconds.

4. The method of claim 3 wherein the duration of said pulse flow of regenerating solution is on the order of two seconds.

5. The method of claim 1 wherein the duration of said pulse flow of regenerating solution is on the order of two seconds and the duration of said non-flow pause time does not exceed about forty seconds.

6. The method of claim 1 wherein said regenerating solution comprises a regenerating chemical solution or a regenerating rinsing solution.

7. The method of claim 1 wherein said complete sedimentation of said ion exchange granules occurs particularly in the region of regenerating solution feed.

8. The method of claim 1 wherein said hydrodynamic lift of said ion exchange granules creates loosening zones across an entire cross section of said bed.

9. The method of claim 1 wherein said treatment of the aqueous solution is softening or demineralization.

10. A method of softening or demineralizing an aqueous solution using one or more ion exchangers which comprises:
 (a) introducing feed water downwardly into an ion exchanger to remove ions from the feed water and transfer said ions to ion exchange beads within the ion exchanger, said ion exchange beads having a layered concentration profile after transfer of said ions thereto;
 (b) regenerating said ion exchange beads by passing a regenerant chemical solution upwardly into the ion exchanger in the form of an intermittent pulse flow comprising an alternating pulse flow of regenerant chemical solution of short duration and a subsequent non-flow pause time of longer duration, the duration and velocity of said pulse flow of regenerant chemical solution being sufficient to hydrodynamically lift substantially all of said ion exchange beads without causing significant mixing of said beads between, different layers, and the duration of said subsequent non-flow pause time being sufficient to permit said ion exchange beads to resettle in the ion exchanger to substantially complete sedimentation; and
 (c) rinsing said ion exchange beads by passing a regenerant rinse solution upwardly into said exchanger in the form of intermittent pulse flow.

11. In a method for softening or demineralizing an aqueous solution introduced to an ion exchanger in a downward charging direction, and regenerating and rinsing the ion exchanger by a regenerating chemical solution and a regenerating rinse solution introduced into the ion exchanger in an upward direction, said ion exchanger containing a non-constrained bed of ion exchange granules, wherein the step of regenerating or rinsing said ion exchange granules with the respective chemical solution or rinse solution comprises:
 passing the respective chemical solution or rinse solution upwardly through substantially the entire bed of ion exchange granules in an intermittent pulsed flow comprising an alternating pulse flow of solution and a subsequent non-flow pause time of solution, the duration and velocity of said pulse flow of solution being sufficient to lift said ion exchange granules a distance no greater than ten times the largest diameter of the ion exchange granules without causing significant mixing of said ion exchange granules, and the duration of said subsequent non-flow pause time being sufficient to permit said ion exchange granules to resettle in the ion exchanger to substantially complete sedimentation.

12. In the method in accordance with claim 11, wherein the steps of regenerating and rinsing said ion exchange granules are both carried out by passing both said chemical solution and said rinse solution upwardly through substantially the entire bed of ion exchange granules in said intermittent pulsed flow.

* * * * *